3,021,369
**PREPARATION OF 2,3,6-TRICHLORO-PHENYL-
ACETAMIDE**
Edwin Dorfman, Grand Island, Edward D. Weil, Lewiston, and Jack S. Newcomer, Wilson, N.Y., assignors to Hooker Chemical Corporation, Niagara Falls, N.Y., a corporation of New York
No Drawing. Filed Mar. 9, 1960, Ser. No. 13,693
5 Claims. (Cl. 260—558)

This invention relates to a process of manufacture. The inventive concept of this invention resides in a novel process for the manufacture of 2,3,6-trichlorophenylacetamide.

Briefly, the process of this invention comprises dissolving trichlorophenylacetonitrile in sulfuric acid and adding the resultant solution to an agitated two-phase mixture of water and an organic solvent.

Co-pending applications, S.N. 692,046, filed in the United States Patent Office on October 24, 1957, and S.N. 730,051, filed in the United States Patent Office on April 22, 1958, disclose the use of 2,3,6-trichlorophenylacetic acid and certain derivatives as herbicides. Included in these disclosures is a teaching that the amides may be preferred under certain conditions, such as where long duration of action is required or in regions of high rainfall. 2,3,6-trichlorophenylacetamide is exceptional under these circumstances because of its low solubility in water and in most other solvents. This low solubility necessitates the use of this compound in the solid form. Since most soil sterilants are applied as dispersions in water, it is necessary to convert 2,3,6-trichlorophenylacetamide to a wettable powder; this term being commonly used in the herbicide art to refer to a finely divided solid which can be dispersed in water and maintained suspended therein by use of gentle agitation, and which can be sprayed thusly using ordinary liquid spray equipment.

In order to prepare a commercially acceptable wettable powder, it is necessary to convert the active ingredient to a brittle, grindable, non-sticky form. In the case of pure 2,3,6-trichlorophenylacetamide, this poses no problem since the pure compound already has these characteristics. However, it is commercially unfeasible to employ the pure isomer and the ordinary technical trichlorophenylacetamide consists of forty to seventy percent 2,3,6-isomer, the remainder being mostly other isomers. This mixture, if prepared by the prior art methods for hydrolysis of phenylacetonitriles to phenylacetamides, is sticky, low melting, and difficultly grindable. It is a principal object of the present invention to make available a process for production of a readily grindable, high-melting trichlorophenylacetamide of enhanced 2,3,6-trichlorophenylacetamide content, starting with crude trichlorophenylacetonitrile which may contain up to sixty percent of trichlorobenzyl chloride, trichloro toluene, and by-products of the reaction of trichlorobenzyl chloride with an alkali cyanide.

We have now found that by dissolving crude trichlorophenylacetonitrile in warm sulfuric acid, decanting any acid-insoluble components, and then adding the acid solution to a stirred two-phase mixture of water and an organic solvent, the amide is precipitated in a form eminently suited for incorporation into a wettable powder. The first step of dissolving the nitrile in sulfuric acid is carried out at thirty to one hundred and twenty degrees centigrade, preferably fifty to one hundred degrees centigrade, and the concentration of sulfuric acid should be in the range of seventy to one hundred percent by weight. Approximately eighty percent sulfuric acid is preferred because of the resultant low viscosity obtained when only a slight excess over the theoretical amount of sulfuric acid is used. At least one molar equivalent of sulfuric acid relative to nitrile should be employed to assure complete conversion, and some excess of sulfuric acid is preferred, to reduce the viscosity of the solution to a convenient level. The resultant solution, in which the nitrile is probably present in chemical combination with the sulfuric acid as an anhydride or imide-like compound, is added to an excess of water, at least one mole of water being stoichiometrically required but an excess being preferred to facilitate agitation and filtration, this water being agitated during the addition with an immiscible organic solvent selected from the group consisting of benzene, an alkylbenzene, a halobenzene, a chlorinated lower alkane, trichloroethylene, or perchloroethylene. Preferred solvents are chlorobenzene and toluene. The resultant three-phase system consisting of solid trichlorophenylacetamide, an aqueous layer containing sulfuric acid and ammonium bisulfate, and an organic layer containing by-products and inactive trichlorophenylacetamide isomers is filtered or centrifuged to isolate the trichlorophenylacetamide product now enriched in 2,3,6-trichlorophenylacetamide. This product is then preferably washed with more of the organic solvent and water, then dried and ground with solid carriers, diluents, dispersing agents, and wetting agents to prepare the commercial wettable powder. The particular composition of the wettable powder can be varied over wide bounds.

To further illustrate and distinguish this new process from the prior art, the following example is given:

The starting material was prepared as described in our co-pending application S.N. 692,046 by reaction of sodium cyanide with a crude trichlorobenzyl chloride having 0.65 chlorine atoms per mole on the side chain.

A vessel having provisions for stirring and cooling is charged with seven hundred and seventy-five pounds of eighty-five percent sulfuric acid, and with the agitator in operation, two thousand pounds of the crude trichlorophenylacetonitrile containing forty-five to fifty percent of the 2,3,6-isomer is added at seventy to eighty degrees centigrade. Agitation is stopped when the exothermic reaction is complete. A layer consisting of eight hundred and forty-nine pounds of insoluble organic liquid is decanted, and sent to a recovery still for recovery of trichlorotoluene and possibly trichlorobenzyl chloride contained therein. The sulfuric acid layer is then fed slowly into a baffled vessel in which has been placed one thousand three hundred and fifty pounds of toluene and one thousand five hundred and thirty pounds of water, the two liquids being intimately mixed by vigorous agitation during the addition of the acid solution, and the temperature being held at twenty to sixty degrees centigrade. The resultant three-phase slurry is filtered. The filtrate is separated by decantation into two layers, a spent sulfuric acid layer which may be discarded and an organic layer which is sent to a recovery still for recovery of toluene. The solids are washed with one thousand pounds of toluene, the washings also being sent to the toluene recovery still, and the solids then washed with water and dried at approximately one hundred and twenty degrees centigrade.

The resultant product consists of eight hundred and forty pounds of dry, brittle, trichlorophenylacetamide containing sixty to sixty-five percent of the 2,3,6-isomer. This product is readily ground to a wettable powder using typical adjuvants.

A representative wettable powder formulation comprises eight hundred and forty pounds of the dried amide, three hundred and forty-nine pounds of Microcel E (a silicaceous inert filler), sixty-three pounds of Marasperse (a lignin sulfonate dispersing agent) and eight pounds of Sorbit P (an arylsulfonate wetting agent). Many other adjuvant combinations may be used, and the details of the wettable powder formulation are not critical to the process of the invention.

By comparison, the precipitation of the trichlorophenylacetamide by addition of the sulfuric acid solution of the nitrile to water alone, resulted in a sticky, non-grindable product which could not be washed free of gummy constituents by use of organic solvents, and which was not suitable for the production of a wettable powder therefor.

This application is a continuation-in-part of Serial Number 692,046, filed in the United States Patent Office on October 24, 1957.

We claim:

1. A process for the production of 2,3,6-trichlorophenylacetamide which comprises dissolving trichlorophenylacetonitrile in sulfuric acid and adding the resultant solution to an agitated two-phase mixture of water and an organic solvent.

2. A process for the production of 2,3,6-trichlorophenylacetamide which comprises adding trichlorophenylacetonitrile to sulfuric acid, agitating the resultant mixture, maintaining the temperature of said mixture at about thirty to one hundred and twenty degrees centigrade, adding said mixture to a stoichiometric excess of water together with an immiscible organic solvent, and separating out by filtration the trichlorophenylacetamide product formed.

3. A process for the production of 2,3,6-trichlorophenylacetamide which comprises adding trichlorophenylacetonitrile containing from about forty to seventy percent of the 2,3,6-isomer to sulfuric acid, agitating the resultant mixture, maintaining the temperature of said mixture at about thirty to one hundred and twenty degrees centigrade, adding said mixture to a stoichiomeric excess of water together with an immiscible organic solvent, and separating out by filtration the trichloropheylacetamide product formed.

4. A process for the production of 2,3,6-trichlorophenylacetamide which comprises adding about one part of trichlorophenylacetonitrile to about 0.5 part sulfuric acid, agitating the resultant mixture, maintaining the temperature of said mixture to about thirty to one hundred and twenty degrees centigrade, adding said mixture to a stoichiometric excess of water together with an immiscible organic solvent and separating out by centrifuge the trichlorophenylacetamide product formed.

5. A process for the production of 2,3,6-trichlorophenylacetamide which comprises adding about one part of trichlorophenylacetonitrile to about 0.5 part sulfuric acid, agitating the resultant mixture, maintaining the temperature of said mixture to about thirty to one hundred and twenty degrees centigrade, adding said mixture to a stoichiometric excess of water together with an immiscible organic solvent selected from the group consisting of benzene, an alkylbenzene, a halobenzene, a chlorinated lower alkane, trichloroethylene, perchloroethylene, toluene and mixtures thereof, and separating out by centrifuge the trichlorophenylacetamide product thereof.

References Cited in the file of this patent

UNITED STATES PATENTS 2,489,348    Wenner _____ Nov. 29, 1949

OTHER REFERENCES

Snyder et al.: Journal of the American Chemical Society, vol. 76, pages 3039–3040.

Travagli: Chemical Abstracts, vol. 31, page 3873 (1937).

Mujmdar et al.: Chemical Abstracts, vol. 43, page 3696–97 (1949).

Travagli: Chemical Abstracts, vol. 43, page 1248 (1949).

Wenner: Journal of Organic Chemistry, vol. 15, pages 548–551 (1950).